Sept. 13, 1966 W. H. STULEN 3,271,986
EXTRUSION APPARATUS AND METHOD
Filed Dec. 9, 1964 6 Sheets-Sheet 2

INVENTOR.
WALTER H. STULEN
BY
Seidel & Gonda
ATTORNEY

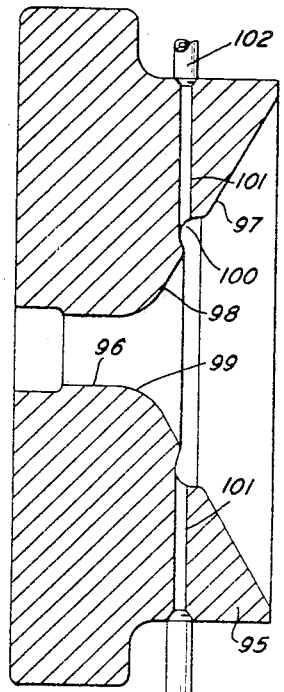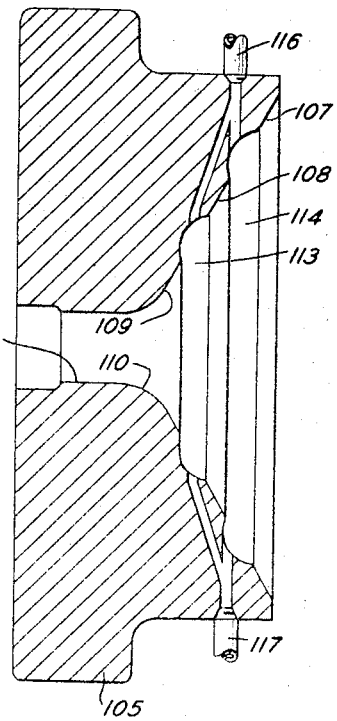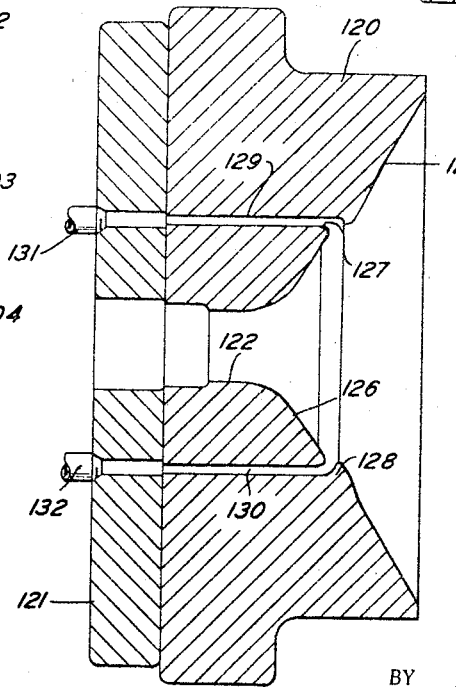

Sept. 13, 1966   W. H. STULEN   3,271,986
EXTRUSION APPARATUS AND METHOD
Filed Dec. 9, 1964   6 Sheets-Sheet 4

INVENTOR.
WALTER H. STULEN
BY
*Seidel & Gonda*
ATTORNEY

Sept. 13, 1966  W. H. STULEN  3,271,986
EXTRUSION APPARATUS AND METHOD
Filed Dec. 9, 1964  6 Sheets-Sheet 5

INVENTOR.
WALTER H. STULEN
BY
ATTORNEY

INVENTOR.
WALTER H. STULEN

United States Patent Office 3,271,986
Patented Sept. 13, 1966

3,271,986
EXTRUSION APPARATUS AND METHOD
Walter H. Stulen, North Caldwell, N.J., assignor to Baldwin-Lima-Hamilton Corporation, Philadelphia, Pa., a corporation of Delaware
Filed Dec. 9, 1964, Ser. No. 417,187
14 Claims. (Cl. 72—267)

This application is a continuation-in-part of my copending application Serial No. 212,991, filed July 27, 1962, now abandoned.

This invention relates generally to the extrusion of metal and more particularly to a method and apparatus for lubricating, insulating or cooling the flowing metal to ease the extrusion of metal shapes.

In the extrusion of metal, it is well-known that the conventional extruding process may lead to an irregular lubrication of the surfaces of the extrusion die or the metal being extruded. In the event of incomplete or inadequate lubrication, the flowing metal of the billet which comes into contact with the die surfaces tends to "stick" so that there is gripping, galling, and carrying away of the metal of the die by the extruded metal resulting in rapid wearing of the die as well as scoring of the extruded surfaces so that they are irregular and may even require finishing operations.

During the extrusion of metals the lubrication tends to be insufficient, for example, in the middle region of the longer sides of the cross section of an extruded bar. It is known to use lubricants in the die prior to the extrusion operation. It has been recommended to provide the metal billet being extruded with a glass sleeve which has facilitated the extrusion of steels not otherwise capable of being extruded.

The large pressures developed to extrude metals by flowing it through the die orifice preclude introduction of a lubricating medium onto the die surfaces in conventional equipment since the medium would have to be introduced into a container assembly or die at a pressure exceeding the extrusion pressure in order to gain entry within the container during the entire period extrusion is taking place. In many cases the pressures developed in extruding metals are of the order of 50,000 pounds per square inch and as high as 300,000 pounds per square inch. The problem is further complicated by the high temperature of the billet during the extrusion process which is generally 2200–2300° F. for steel. Hence, it should be obvious that it is extremely difficult as well as hazardous to develop higher pressure forces for introducing lubricating or other mediums into the container assembly while a billet is being extruded.

It is readily apparent that the introduction of a lubricant at such pressures would tend to develop hazardous conditions in which the lubricant would be subjected to heat and would tend to reach or exceed its flashpoint. In the event of a line rupture, hazardous conditions would result.

A principal object of the present invention is to provide a die having a larger life span.

Another object of the present invention is to provide a method and apparatus for applying a lubricating medium to a billet while being subjected to extrusion forces, without the need of developing high pressures in applying the medium.

Another object is to provide a method and apparatus for applying a lubricating or insulating medium either in a liquid state or solid state to metal and at any desired temperature to control the extrusion process for optimum operation and results.

It is still another object of the present invention to provide a novel extrusion apparatus and/or method wherein less ram pressure is required, dies have a greater useful period, extruded parts have a better finish over an extended length, and/or the range of metals which can be extruded with a single die is increased.

A feature of the invention is the provision of a method and apparatus in which a metal billet is confined in a container cooperative with an extrusion die. The metal is subjected to pressure forces applied in a direction to flow the metal through the extrusion orifice of the die. In order to lubricate the peripheral portions of the flowing metal, the flowing metal is rendered free of laterally restrictive forces along annular zones in communication with the flowing metal and disposed along peripheral portions of the flowing metal axially spaced relative to the flowing metal. This is accomplished by providing areas or zones defined by rapid contour changes on the surfaces or faces of the tools exposed to the material being extruded so that the flowing metal is not subjected to laterally restrictive forces. The low pressure zones or areas are in constant communication with the flowing metal. Ports and passageways in communication with the zones are provided through which a lubricant or insulating medium under low pressure is applied to the metal while it is being extruded.

Another feature of the method and apparatus according to the invention is the provision of the reduced or low pressure zones or areas in the various extrusion components of an extrusion machine, for example in the die, a container liner or insert, or mandrel. According to the present invention, the method is applicable to direct and indirect extrusion processes and to the extrusion of solid and hollow shapes.

Other features and advantages of the method and apparatus in accordance with the present invention will be better understood as described in the following specification and appended claims, in conjunction with the following drawings.

For the purpose of illustrating the invention there is shown in the drawings forms which are presently preferred; it being understood, however, that this invention is not limited to the precise arrangements and instrumentalities shown.

Figure 8:
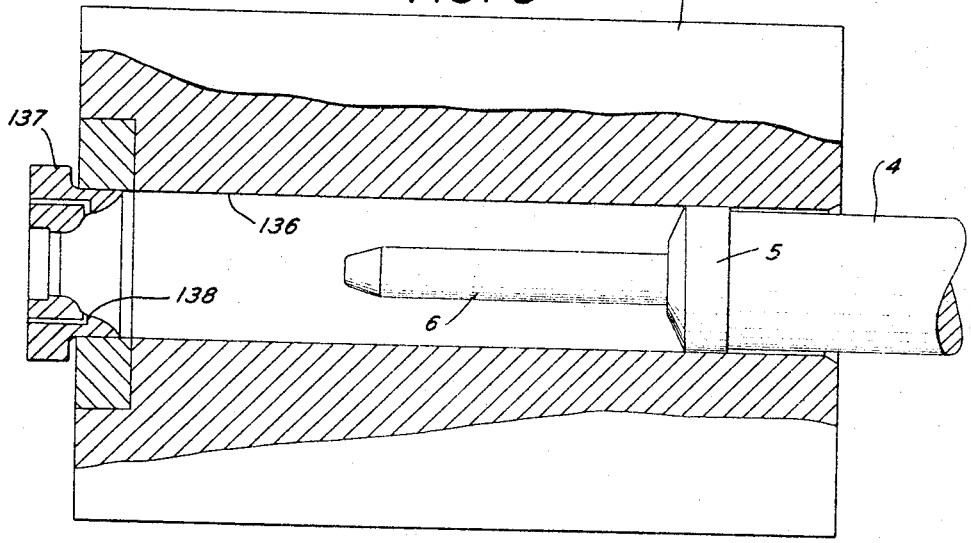
Figure 9:
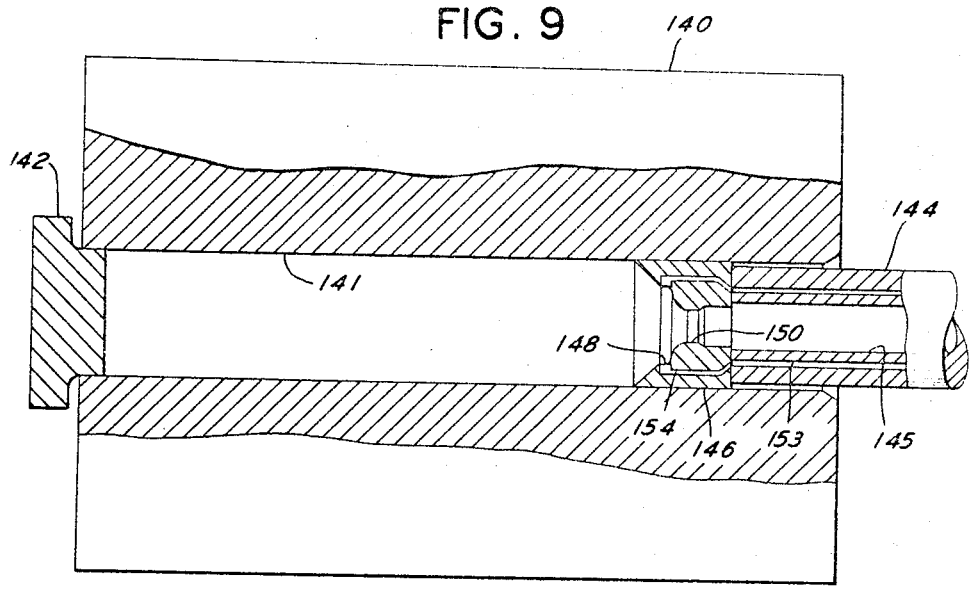
Figure 10:
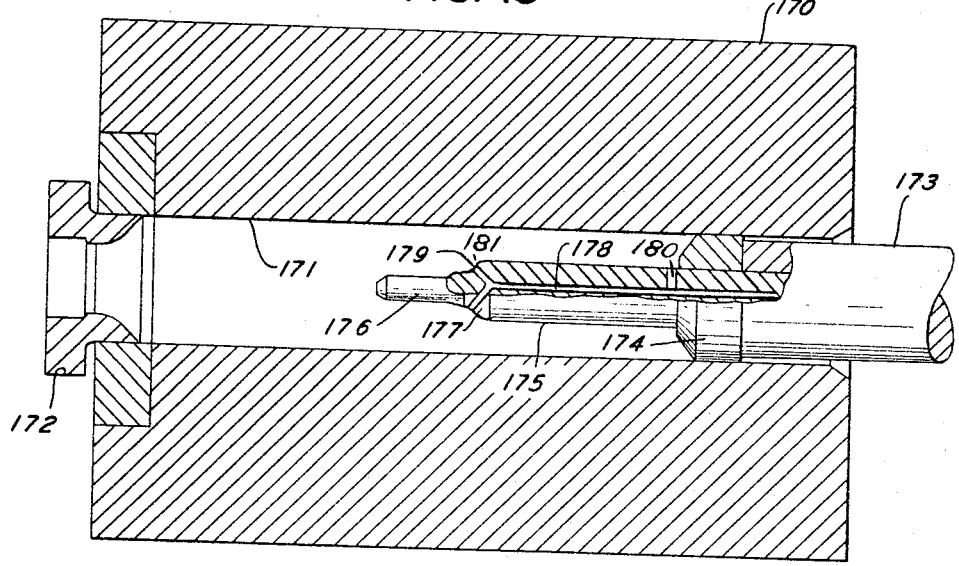
Figure 11:
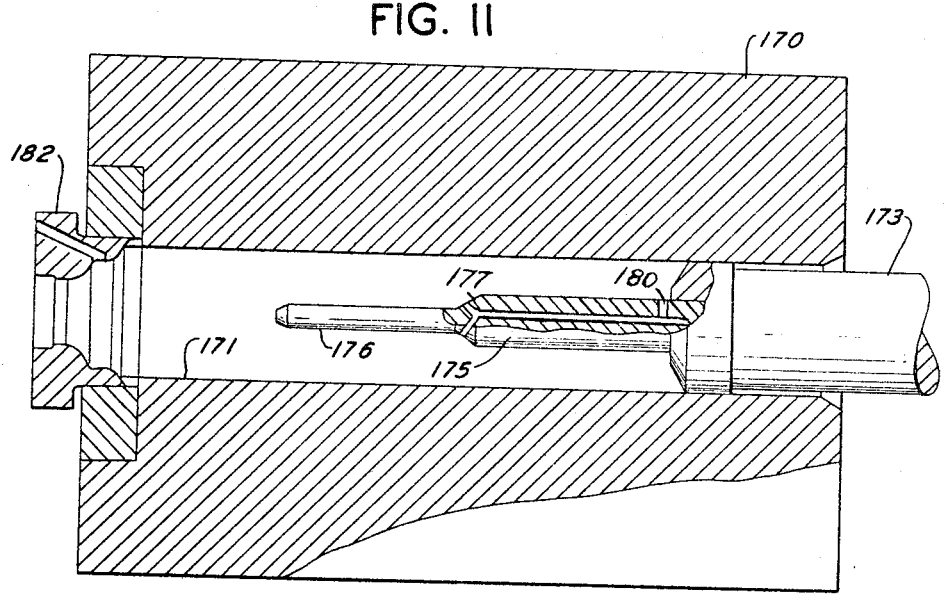
Figure 12:
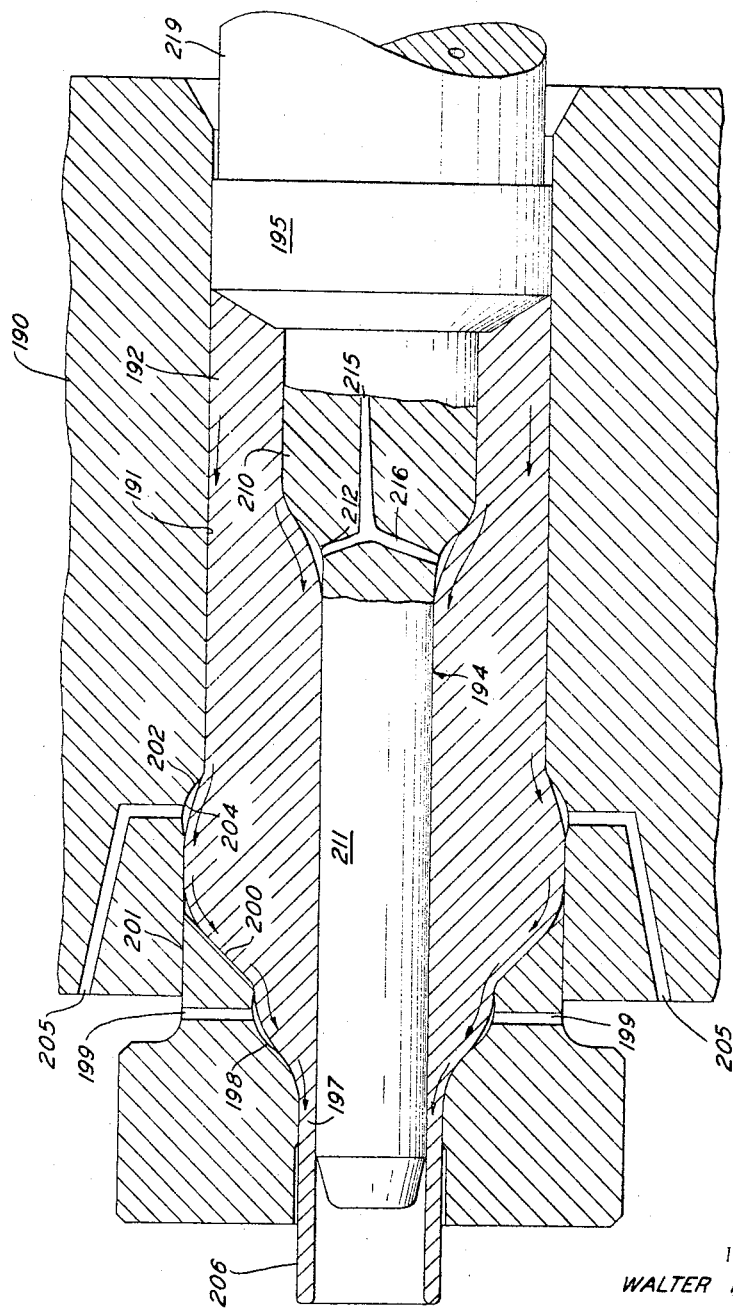

FIGURES 5, 6, and 7 are diagrammatic cross section views of other extrusion die embodiments provided with reduced or low pressure zones or areas according to the invention;

FIGURE 8 is a diagrammatic cross section view of a container assembly and die illustrative of the utilization of a low pressure zone in the extrusion die in a conventional forward extrusion machine;

FIGURE 9 is a diagrammatic cross section view of a container assembly and die illustrative of the application of the invention to an inverse extrusion press;

FIGURE 10 is a diagrammatic cross section view of a container assembly illustrative of the application of the invention to apparatus for forming hollow shapes;

FIGURE 11 is a diagrammatic cross section view illustrative of a container assembly and die in which the invention is applied to the extrusion die, container insert and mandrel of apparatus for extruding hollow shapes; and FIGURE 12 is a diagrammatic cross section view of a container assembly and die illustrating metal flow in a press provided with low pressure zones in position on the die, container liner and mandrel and illustrative of an arrangement usable for extruding hollow shapes and solid extrusions when modified.

Figure 1:
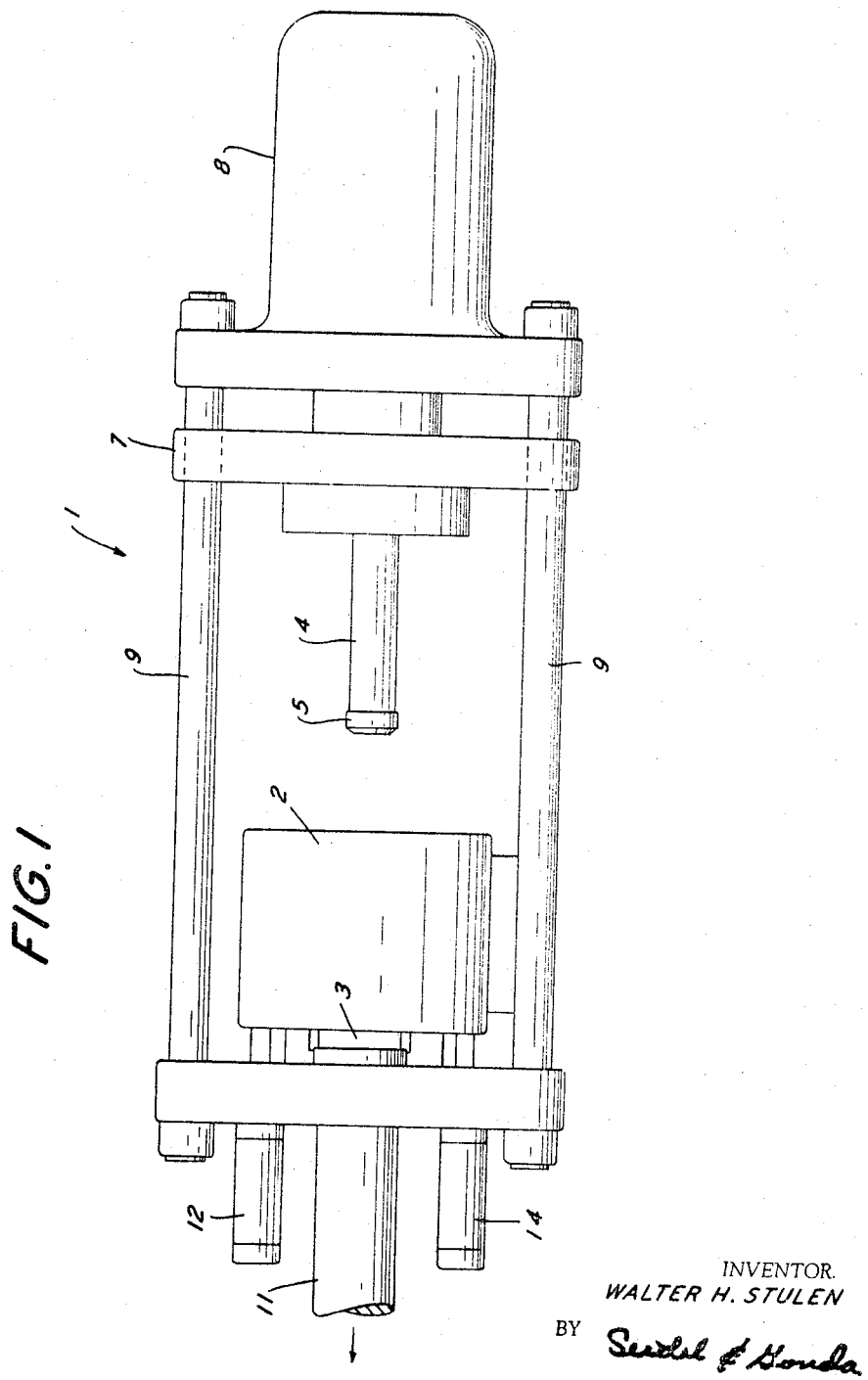
FIGURE 1 is a fragmentary plan view of an extrusion press to which the invention is applied.

The method according to the invention is applicable to conventional extrusion presses, for example to a horizontal press 1 illustrated fragmentarily in FIGURE 1. While the invention will be described as applied to a horizontal extrusion press it will be understood that it is equally applicable to other types of extrusion presses. Conventional horizontal extrusion presses comprise a container assembly 2 for confining a metal billet therein as hereinafter described in combination with a die stack 3 for extruding metal shapes. In conventional extrusion operations a ram 4 is insertable longitudinally into the container and provided with a dummy block or pressing disc 5 for forming solid shapes. A removable mandrel which may be separately actuated is generally employed for extruding hollow shapes.

The ram 4 is mounted on a moving crosshead 7 actuated reciprocably by a main pressing cylinder 8. The cylinder 8 is provided with hydraulic fluid from a source, not shown, for hydraulically driving the ram 4 and crosshead 7, which are guided by guides 9, to subject the metal billet to forces so that the metal is extruded in known manner through the die stack 3. The extrusion 11 is extruded out of the die stack as illustrated. The press is provided with run-out guides 12, 14. Control mechanism, not shown, for controlling the press operations is provided in known manner.

In the description of the invention hereinafter like reference numerals denote like parts in order to simplify the drawings and for a better understanding of the invention. According to the invention a method and apparatus for rendering the flowing metal free of laterally restrictive forces along annular axially spaced peripheral portions of the ingot are provided. A container assembly comprising a container is provided with a bore in which a billet, not shown, is disposed, for extrusion by axially directed pressures by a dummy block 5 mounted on a ram or stem 4 reciprocably operable in the extrusion press. The ram 4 is driven longitudinally in a direction toward the left side of the drawings and causes metal of billet in the bore, which is subjected to laterally restrictive forces because of its confinement in the bore, to flow through an extrusion and shaping die. The shaping die is provided with an extrusion orifice and converging entry surfaces.

In each of the applications or embodiments of the invention hereinafter described, provision is made for defining a low pressure zone by a rapid change in contour of the working surfaces so that the flowing metal will not follow the working surfaces at this region. Hence, the metal is free of laterally restrictive forces in the low pressure zone so that a cooling, lubricating or insulating medium can be applied thereto.

Figure 2:
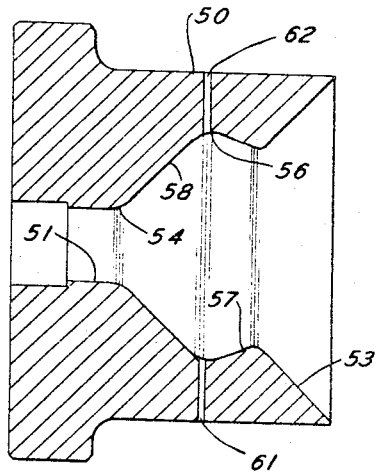
FIGURES 2, 3 and 4 are diagrammatic cross section views of different extrusion dies provided with reduced or low pressure zones according to the invention.

In FIGURE 2 a die 50 is illustrated as being provided with an extrusion or forming orifice 51 and converging entry surfaces 53 converging toward a throat 54 of the die. Die 50 is illustrative of one embodiment of a die forming part of die stack 3. The metal being extruded flows along the tapered converging surface 53 with radially constrictive pressure being applied thereto due to the extrusion forces applied by a ram as heretofore described. An annular reduced pressure zone 56 defined by rapidly diverging surface 57 is formed in the die. This low pressure zone has a generally diverging entry surface merging smoothly with a converging surface 58 converging toward the throat 54.

The metal flowing through the die 50 flows from surface 53 to surface 58 without touching the deepest point of the zone 56 so that the peripheral surfaces of the flowing metal passing past the low pressure zone 56 are free of laterally restrictive or confining forces. Hence, a lubricant under low pressure may be thereto through passageways 61, 62 opening to the reduced pressure zone 56. The flowing metal is constantly subjected to the medium introduced at the critical area where it is not subjected to very high forming pressures.

The annular area 56 defines a rapid change in contour of the surfaces 53 and 57 of the die which are in contact with the flowing metal. The material being extruded will not deform exactly to the rapidly changing contour of the die at extrusion velocities greater than 10 feet per second. Depending upon the extrusion cycle, pressures to deform the material will change due to various reasons, for example, thermal change of the material being extruded and velocity variations. Since a reservoir of lubricant medium is maintained in this low pressure region, higher extrusion pressures cause the flowing material to pick up more of the medium within the reservoir formed by the rapid contour change as it closes in on this reservoir. Thus, when extrusion forces cause a pressure surge upwards the medium is released in greater quantities and conversely the opposite results when the pressure variation is downward.

The variation of extrusion pressure still results in economical use of the lubricating medium as well as superior quality extrusions. Excessive use of the medium when low pressure extrusions are made will cause extruded surface imperfections.

The application of lubricants to the working surfaces of the various extrusion tools such as the container, die, mandrel, pressing disc or dummy block, or introduction into apertures therein in other known methods of extrusion, prior to extruding does not last in sufficient quantities during the entire extrusion cycle to afford maximum protection to the tools. This is especially true when extruding elongated members. Most of the lubricant is expended when pressure is first applied. According to the invention, the medium can be continuously applied even under the most extreme extrusion pressures. Moreover, the method provides for the introduction or application of the medium prior to beginning the extrusion cycle if desired.

After the extrusion period or cycle is complete and extrusion pressures are released, another type of medium may be applied to the tool working surfaces in the same manner as the lubricating medium is applied. For example, in extruding hot extrusions the tool temperatures may exceed the decomposition or flashpoint of the lubricating medium used so that carbon is deposited on the tool surfaces. The second medium can be used to clean out the entry ports and tool working surfaces.

The lubricant medium is applied onto the flowing metal so that positive lubrication may be constantly assured thereby precluding galling, scoring or sticking of the metal to the die surfaces and precluding metal-to-metal contact. Passageways 61 and 62 or conduits coupled thereto are provided with one way check valves. A pump may be provided to inject the lubricant into zone 56 at pressure as low as about 400 p.s.i. whereas the billet being extruded may be subjected to pressures of 20,000 p.s.i. or more. In order to prevent erosion, the juncture of surfaces 53 and 57 is rounded with the radius thereof not more than about $1/32$ of an inch.

Figure 3:
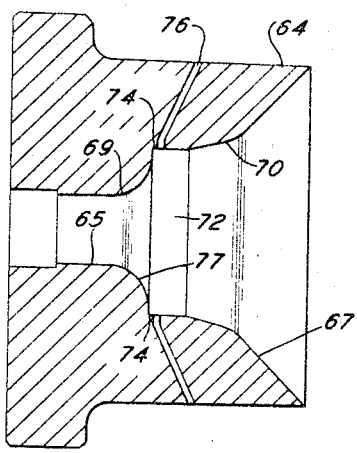

Another configuration of a die teaching the invention is illustrated in FIGURE 3 in which a die 64 is provided with an extrusion orifice 65 and an annular surface 67 converging toward the die throat 69. In this embodiment of the present invention, an annular slightly converging surface 70 is provided merging with a substantially cylindrical annular surface defining a zone 72 between the entry surface 67 and the throat 69 of the die. The annular substantially cylindrical zone 72 is formed such that it terminates abruptly and forms a shoulder 74 provided with a port through which a fluid or solid medium under pressure may be introduced to the reduced pressure zone 72. In operation, the flowing metal tends to flow from the surfaces 67 and 70 axially along part of the surface defining the zone 72 and does not enter the shoulder area so that a medium can be applied at a point in which the metal is free of laterally restrictive forces as heretofore described. The metal flows along the converging surface 77 which merges smoothly with the die throat 69.

Figure 4:
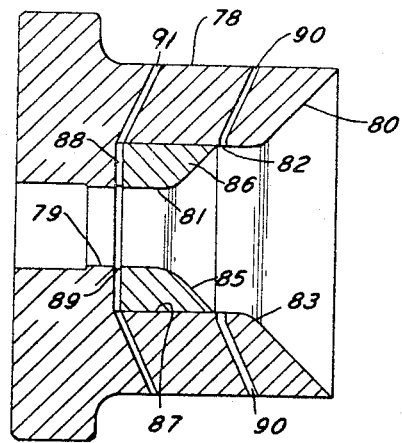

Another embodiment of a die is illustrated in FIGURE 4, in which a die 78 is illustrated as being provided with a die extrusion orifice 79, an annular converging entry surface 80, and a throat 81, and a low pressure zone 82 formed somewhat similar to the illustration of the embodiment in FIGURE 2 in combination with the construction in FIGURE 3. An annular area defined by an annular surface 83 merges with the converging surface 80 with the above-mentioned radius of curvature. A converging surface 85 abruptly merges with surface 83 so that a reduced pressure zone 82 is formed at the juncture of the surfaces 83 and 85. The throat 81 and surface 85 are formed in a die insert 86 housed in a bore 87 in the die 78. The insert 86 is axially spaced from a shoulder 88 so that a reduced pressure zone 89 is formed between the die 78 and die insert 86. Lubricant under pressure may be applied through passageways 91 to reduced pressure zone 89 as well as through passageways 90 to the reduced pressure zone 82 as illustrated in the drawing.

In the illustrations of the various die configurations heretofore described, it is apparent that the various converging or tapered surfaces formed in the die, defining the respective lands therein, form different angles of entry. In known dies the lands or the entry zones, are substantially continuous. In the present invention the formation of the low pressure zones is accomplished by making rapid contour changes in the land surfaces and varying the angles of the entry surfaces thereof. The change of land contours functions as heretofore described to permit the easy introduction of a lubricating or insulating medium into the low pressure zone.

In FIGURE 5 a die 95 is illustrated as having an extrusion orifice 96 with a land defined by entry converging surfaces 97, 98 having the same angle of entry and converging toward a throat 99. An annular reduced pressure zone 100 is formed on the land surfaces by a rapid change of the land surfaces to a diverging surface and then rapidly changing direction and subsequently continuing the land at the same original angle. The reduced pressure zone 100 has its entry and exit surfaces merging smoothly with the entry zone or land surfaces of the die and is of a reduced axial length. However, the zone 100 is of sufficient depth to render laterally constrictive forces on the metal ineffective so that a lubricant or insulating medium can be applied thereto through entry ports or passageways 101 provided from conduits 102, as illustrated.

The injected medium may be caused to flow from source S through conduit 102 by pump 104. A line condition responsive valve such as check valve 103 is preferably provided in conduit 102. If desired, periodic introduction of the medium may be accomplished by connecting timer T to the pump 104.

Provision is made in the invention for a die construction for applications where exceedingly high pressure forces are developed. For example, as illustrated in FIGURE 6 a die 105 is illustrated as having a die orifice 106 and converging entry or land surfaces 107, 108, 109 forming a land converging toward a throat 110 of the die. In this embodiment the die is provided with two spaced annular low pressure zones 113, 114 operative as heretofore described. A medium under pressure may be introduced into zones 113 and 114 through common conduits 116, 117, as illustrated.

Another embodiment of the die of the present invention is illustrated in FIGURE 7 in which a die 120 is illustrated in combination with a back plate 121 in which a larger relief passage is formed. The die 120 comprises converging lands 124 and 126 between which a reduced pressure zone 127 is formed by a generally diverging surface 128 merging smoothly with the land 126. In the low pressure zone 127 the flowing metal is free of laterally restrictive pressure while under extrusion pressure. A lubricant or other medium under pressure may be introduced to zone 127 through passageways 129, 130. These passageways are in communication with conduits 131, 132 via back plate passageways in registry therewith. The passageways 129, 130 have openings or ports in direct communicaiton with the whole low pressure zone 127.

It will be noted that the direction of discharge of the lubricant from passages 129 and 130, as well as the passages heretofore described, is substantially perpendicular to the direction of travel of the material being extruded. If the discharge direction of the passages is opposite to the general direction of the metal being extruded, lubricant discharged on the front face of the billet is wasted and the meal tends to plug up the passages at the end of the extrusion stroke wherein the velocity of the metal approaches zero.

The various dies illustrated and described heretofore are used with conventional direct extrusion apparatus and/or methods for forming solid or hollow shapes. As illustrated diagrammatically in FIGURE 8, there is provided a container 135 having a bore 136 for confining a metal billet, not shown, therein for extrusion. A die 137 embodying a reduced or low pressure zone 138 and therefore similar to die 95 heretofore described is supported by container 135 coaxial with bore 136. A ram 4 on which is disposed a dummy block 5 which in turn supports a mandrel 6 is reciprocably actuated in bore 136 by cylinder 8. As the forming tool or mandrel 6 is advanced axially forward in a direction toward the die 137, the pressure on the die land is increased and reaches a maximum pressure as the block 5 approaches the die 137. The flowing metal is peripherally lubricated or otherwise acted upon by an injected medium in the manner described above.

Although the various illustrations of the application of the invention described heretofore relate to direct extrusion, provision is made in the invention for indirect or inverted extrusion. The application of the invention to an extrusion press for use in indirect extrusion is diagrammatically illustrated in FIGURE 9 in which a container 140 is provided with a through bore 141 in the manner heretofore described. The through bore is sealed at one end by a blind plug 142. A hollow ram 144 is reciprocably supported in bore 141 and is provided with a central bore 145. An extrusion die 146 is mounted on the end of a hollow stem in place of a dummy block.

The extrusion die 146 is provided with a reduced low pressure zone 148 operable in the manner heretofore described. When the ram 144 is driven axially in a direction toward the blind plug 142, a metal billet, not shown, in the container bore 141 is subjected to forces tending to cause the metal to flow through a die orifice 150 in die 146 so that the reduced pressure zone 148 functions as heretofore described. The die orifice 150 is in registry with the bore 145 so that the metal is extruded through the bore 145 and is extracted from the end thereof not shown. The lubricant under pressure is applied through passageways 153, in the hollow ram stem 144 in registry with passageways 154 in the die 146 to the low pressure zone 148 so that the flowing metal is lubricated in the manner heretofore described with respect to the direct method of extrusion. The bore 145 is of greater diameter than the orifice 150 so that the former may act as the second state of the orifice relief passage.

While the various illustrations of the method and apparatus of the present invention heretofore described relate primarily to the lubrication of peripheral zones on the outer surfaces of flowing metal or peripheral portions on the outside of the metal billet, provision is made in the present invention for lubrication of portions or axially spaced portions of the inner peripheral surfaces.

Thus, as illustrated in FIGURES 10, 11 and 12, the various extrusion tools can be formed to carry out lubrication of the inner surfaces or the outer surfaces or a combination of both surfaces. For example, in FIGURE 10 a container assembly is diagrammatically illustrated as comprising a container 170 provided with a bore 171 in which is mounted a conventional die 172. A ram stem 173 is provided with a block 174 on which is mounted a mandrel 175.

The mandrel 175 comprises a cylindrical piercing tool having an axial extension 176 of reduced diameter connected thereto by a generally tapered annular forming surface 177. Surface 177 has a rapid change of contour, thereby providing a low pressure area 181 functioning to permit lubrication through the mandrel 175 and ram stem 173. The mandrel 175 is provided with an axially extending passageway 178 which terminates in ports 179 circumferentially disposed on the tapered surface 177. The passageway 178 is concentric with the longitudinal axis of the ram 173, but a plurality of concentrically arranged passageways could be provided if desired. Passageway 178 may have radially extending ports 180 emerging from mandrel 175 adjacent the tapered face of block 174.

In FIGURE 11, a die 182, which may be identical with die 137, has been substituted for die 172 in bore 171. In this illustration, the die 182 and the mandrel 175 are constructed to carry out joint lubrication of the inner and outer peripheral surfaces of the flowing metal in shaping or extruding a hollow article.

The embodiment of the invention illustrated in FIGURE 12 is essentially the resultant structure obtained by combining various features of the above embodiments. In FIGURE 12, there is illustrated a container liner 190 having a bore 191 in which flowing metal of a billet is illustrated as 192. In this example, a mandrel 194 and block 195 are adapted to be driven in the direction of a die 196 by ram stem 219 for carrying out the application of forces for causing the metal 192 to flow and be extruded through a die extrusion orifice 197. The die 196 is provided with an annular reduced or low pressure zone 198 formed in the manner heretofore described. Passageways 199 in die 196 communicate with the reduced pressure zone 198. The metal 192 flows in the direction of the die 196 and is subjected to high pressure forces against a land 200 on the die 196.

In order to insure positive lubrication at all times on the surface of die land 200, the container liner 190 is formed with a counter bore 201 in which the die 196 is inserted. The die 196 fits snugly therein and is held in position by means, not shown. The counter bore 201 and a generally diverging surface 202 merge smoothly with the major bore 191 of the liner 190 to form a change of contour forming a low pressure zone or relief area 204 into which metal 192 does not enter. The metal 192 is free of laterally restrictive forces in area 204 so that a lubricant or insulating medium can be applied through passageway 205 formed in the liner 190.

Moreover, in order to insure that the inner peripheral surfaces of portions or flowing surfaces of the metal 192 are lubricated, the mandrel 194 is provided with means for forming a reduced pressure zone to permit lubrication of the inner peripheral portions of the hollow shape 206 being extruded. The mandrel 194 is provided with an enlarged portion 210 having a major diameter and an extension or forward piercing tool portion 211 of reduced diameter with an intermediate generally convex surface 212 merging smoothly with the outer surfaces thereof.

Thus, a reduced pressure zone is formed at surface 212 and operates in the manner heretofore described. A lubricant may be flowed into the annular reduced pressure zone at surface 212 through passageway 215 extending axially through the block 195, portion 210 and ram stem 219 and radial passageways 216.

The method of lubrication according to the present invention is applicable to cold or hot extrusion of metals and can be used in deforming operations such as forging, punching, pressing, explosion forming and impact extrusion and similar operations where metal is deformed and flowed and lubrication must be accomplished regardless of the pressures developed between the working surfaces and the metal being deformed. The method and apparatus of the invention provide for application of fluid, solid, or semi-solid material either as lubricants, or mediums for coating and insulating the metal surfaces. For example, such materials as powder or flake graphite, castor oil, powdered copper or aluminum, lubricating grease, lube oil, wax emulsions, clay, powdered glass, powdered Teflon, borax, barium and sodium chlorides, and the fluorides of barium, cadmium, cerium, chromium, and gases having vaporized lubricants can be applied to the metal being deformed.

Heretofore the solutions offered to insure a positive film on the flowing metal have been in part to provide better lubricants to withstand high pressures. With the present invention, continuous lubrication is insured and the lubricant's requirements or characteristics are not as critical.

The numerous advantages of the present invention include longer wear life of the die, a reduction in the necessary ram pressure to effectuate extrusion, a good finish on the extruded shape along its entire length, an increase in the extrusion velocity, an increase in the range of metals which can be extruded with the same die, the ability to extrude metal which heretofore could not be extruded, more accurate control over finished dimensions of an extruded shape, elimination of necessity of finish machining extruded shapes, readily adaptable for use with existing machinery, and elimination of excess material handling necessitated by application of a lubricant such as glass fibers directly to the billet before the extrusion process commences.

In the above embodiments of the present invention, the mandrels are illustrated as being integral with the ram stems. It will be obvious to those skilled in the art that the present invention is equally applicable for use with separately actuated mandrels.

It will be appreciated that a valve device will be utilized with the flow lines for directing a medium to each of the low pressure zones in each embodiment of the present invention. The low pressure zones exist as a result of the high velocity of the flowing metal, that is, more than 10 feet per second. As the flowing metal reaches zero velocity at the end of the stroke, the valve device cooperates with the medium in the low pressure zones and passages in communication therewith to oppose the pressure of the flowing metal, thereby preventing the flowing metal from bypassing the die orifice.

In view of the comparative slow velocities of extrusion devices wherein the velocity of the flowing metal may be 15 feet per second, a tapered surface such as surface 97 must precede the low pressure zone. Each of the above-described embodiments will have a lead edge between the tapered surface and the low pressure zone which has a radius of preferably not more than $\frac{1}{32}$ of an inch. The timing of lubricant injection is quite important and should occur simultaneously with contact of the billet with the die entry surface. The lubricant injection can be controlled with a limit switch contacted by the ram or by a pressure switch responsive to build-up of pressure in the ram cylinder due to such contact.

Steel billets normally are preheated to a temperature of about 2000° F. This temperature is well above the flashpoint temperature (about 1100° F.) for commercially available lubrication grease. Hence, the lubricant medium in contact with the heated flowing metal immediately vaporizes and forms a gas film for the metal as it passes through the die orifice. The vaporized lubricant is carried by the flowing metal as a film thereon as evidenced by a carbon film on the tool surfaces. The carbon film is easily cleaned off when desired.

While preferred embodiments of the invention have been shown and described, it will be understood that

I claim:

1. The method of extruding hollow metal shapes through a die having an extrusion orifice which comprises providing a metal billet, confining the billet, piercing the billet, subjecting the billet to forces applied in a direction to flow the metal of the billet through said extrusion orifice, rendering the inner periphery of the flowing metal free of laterally restrictive forces in a given zone in communication with said metal, providing a source of a flowable medium at a pressure substantially below and unrelated to the pressure of the flowing metal, and introducing said medium into said zone to form at least a surface layer of the flowing metal with said medium.

2. Apparatus for extruding metal shapes from metal billets which comprises die means having an extrusion orifice, container means cooperative with said die means for confining a metal billet, means for subjecting the confined metal billet to forces applied in a direction to flow the metal of the billet through said orifice, said die means having working surfaces defining at least one annular area in communication with peripheral portions of the flowing metal for rendering the flowing metal moving past said area free of laterally restrictive forces during application of said first-mentioned forces, means for introducing a flowable medium through said die means to said area, said metal blank force applying means including a piercing tool, said tool having working surfaces defining at least one annular area in communication with an inner peripheral portion of flowing metal for rendering the metal flowing past said last-mentioned area free of laterally restrictive forces during application of said first-mentioned forces, and means for introducing a lubricant medium into said last-mentioned area, whereby inner and outer peripheral portions of said flowing metal will be lubricated.

3. Apparatus for extruding metal shapes from metal billets which comprises die means having an extrusion orifice, means cooperative with said die means for confining said billets, tool means for subjecting the confined billet to forces applied in a direction to flow the metal of the billet through said orifice and for piercing said billet to form a hollow shape, said tool means having working surfaces defining at least one annular area in communication with inner peripheral portions of the flowing metal for rendering the flowing metal moving past said area free of laterally restrictive forces during application of said first-mentioned forces, and means for introducing a flowable medium into said area.

4. A method of extruding shapes through a die having an extrusion orifice which comprises providing a billet, confining the billet, subjecting the material of the billet to forces applied in a direction to flow the material of the billet through said orifice, rendering the flowing material of the billet free of laterally restrictive forces in a given annular zone in communication with the inner peripheral portions of the material of said billet and in a different given annular zone in communication with the outer peripheral portions of the flowing material of said billet, providing a source of a flowable medium at a pressure substantially below and unrelated to the pressure of the flowing material of said billet, and injecting said medium into said zones to form at least a surface layer of the medium on the flowing metal of the billet.

5. A method of deforming metal and shaping it comprising providing a heated billet, confining the billet, subjecting the billet to forces directed to cause the material of the billet to flow in preselected directions and simultaneously applying laterally restrictive forces to shape the material of the billet, rendering the flowing material of the billet free of said laterally restrictive forces along a preselected annular zone in communication with the flowing material of the billet, providing a source of a flowable medium at a pressure substantially below and unrelated to the pressure of the flowing material of the billet, injecting said medium into said zone, and causing said medium to vaporize on contact with the material of said billet to apply a surface layer of said vaporized medium on the flowing material of said billet flowing past said zone.

6. The method of extruding metal shapes through a die having an extrusion orifice which comprises providing a metal billet, confining the billet, subjecting the billet to forces applied in a direction to flow the metal of the billet through said extrusion orifice, rendering the flowing metal free of laterally restrictive forces along annular zones in communication with said flowing metal and disposed along peripheral portions of the flowing metal axially spaced relative to the flowing metal, providing a source of a flowable medium at a pressure substantially below and unrelated to the pressure of the flowing metal, and injecting said medium into said zones upon contact of the metal with the die to coat the flowing metal with said medium to ease extrusion thereof through said orifice.

7. A method of extruding metal shapes through a die having an extrusion orifice which comprises providing a metal billet, confining the billet, subjecting the billet to forces applied in a direction to flow the metal through said orifice, providing a tapered annular surface imposing laterally restrictive forces on the flowing metal, providing the tapered surface intermediate its ends with an annular low pressure zone to render the flowing metal opposite thereto free of laterally restrictive forces, moving the metal across said tapered surface at a sufficient velocity so that the moving metal does not enter said low pressure zone, introducing a lubricating medium into said annular zone at a pressure substantially below the pressure to which said metal billet is subjected to form at least a surface layer of said medium on said flowing metal to ease the extrusion of said flowing metal through said orifice.

8. The method of extruding metal shapes through a die having an extrusion orifice which comprises providing a heated metal billet, confining the billet, subjecting the billet to forces applied in a direction to flow the metal of the billet through said orifice, subjecting the flowing metal to a tapered surface, providing the tapered surface with a low pressure zone intermediate its ends, flowing the metal across said tapered surface at a sufficient velocity so that the flowing metal does not enter said low pressure zone, introducing a lubricating medium into said zone with the lubricating medium having a flash point below the temperature of said billet, vaporizing the lubricating medium by contact with said flowing metal to form at least a surface layer of the vaporized medium on the flowing metal to ease the extrusion of the flowing metal through said orifice.

9. The method of extruding metal shapes through an extrusion orifice which comprises providing a metal billet having a greater cross section than the traverse dimension of said orifice, confining the billet, subjecting the billet to forces applied in a direction to cause the metal to flow through said orifice, rendering the flowing metal substantially free of laterally restrictive forces along a confined zone in communication with an annular portion of the flowing metal, and continuously introducing a lubricant at a pressure unrelated to the pressure of the flowing metal into said zone to coat the flowing metal in said zone with lubricant to ease the extrusion of said metal through said orifice.

10. A method of extruding metal shapes through a die having an extrusion orifice which comprises providing a metal billet, confining the billet, subjecting the billet to forces applied in a direction to flow the metal through said orifice, subjecting the flowing metal to laterally restrictive forces by means of tapered surfaces radially spaced from one another with respect to the axis of said orifice by a low pressure zone, causing the flowing metal to move at a velocity greater than ten feet per second so that the flowing metal skips from one tapered surface to the other tapered surface without entering the low pressure zone, introducing a lubricant into the low pressure zone when the metal contacts said one tapered surface, and in a direction generally perpendicular to the axis of the orifice, and causing the lubricant to form a film on the periphery of the flowing metal to ease the extrusion of the flowing metal through said orifice.

11. Apparatus for forming metal shapes comprising means defining shaping and forming surfaces including first and second spaced tapered surfaces separated by an annular low pressure zone, the entirety of said second tapered surface being disposed radially outwardly from said first surface, means cooperative with said defining and shaping surfaces for confining a quantity of metal, means for subjecting a confined quantity of metal to forces applied in a direction and of a magnitude to flow the metal in contact with said tapered surfaces and at a velocity so that the flowing metal does not enter the low pressure zone, and means for introducing a lubricant medium into said low pressure zone to apply a film of the lubricant to an annular peripheral portion of the metal to ease the movement of the metal across said shaping and forming surfaces.

12. Apparatus for use in extruding metal shapes and adapted to be used in conjunction with a container assembly comprising a die having an extrusion orifice, said die having two axially spaced converging surfaces separated by a concave surface, one of said surfaces being closer to said orifice than the other surface, substantially the entirety of said one surface being closer to the longitudinal axis of said orifice with respect to the other surface, said die means including a passage means having one end communicating with said concave surface and extending in a direction generally perpendicular to the longitudinal axis of said orifice so that a flowable medium may be introduced therethrough into a low pressure zone defined on said die means by said concave surface, and said concave surface being annular and circumscribing the longitudinal axis of said orifice.

13. Impact extrusion apparatus wherein an axially movable ram extends into a bore of a container, the improvement comprising a die having an orifice coupled to one end of said ram in a manner so that said die orifice is in line with an axial bore in said ram, said die having a converging tapered surface interrupted by a generally concave annular surface circumscribing the longitudinal axis of said orifice, and said ram and die having passages therein for introducing a flowable medium into a low pressure area defined by said generally concave surface and in a direction generally perpendicular to the longitudinal axis of said ram, whereby lubricant may be introduced through said passages into said low pressure area during extrusion of a billet through said orifice.

14. Apparatus comprising a container having a longitudinal bore, a die mounted at one end of the container and having an orifice in line with the longitudinal axis of said bore, said die having a tapered surface converging toward said orifice, a mandrel extending into said bore, said mandrel having an annular tapered surface thereon, said tapered surfaces each being interrupted by a discrete generally concave surface, said die and mandrel each having a passageway communicating with their respective generally concave surface for the introduction of a lubricating medium into a low pressure zone defined by each generally concave surface, whereby lubricant may be introduced into the low pressure zones to coat a film of lubricant on the inner and outer surfaces of a hollow article being extruded through said orifice.

References Cited by the Examiner

UNITED STATES PATENTS

| 1,331,169 | 2/1920 | Swift et al. | 207—19 |
| 2,258,930 | 10/1941 | Haefner | 72—42 |
| 2,887,224 | 5/1959 | Stulen | 207—10.1 |
| 2,907,454 | 10/1959 | Sejournet | 207—10.1 |
| 2,962,164 | 11/1960 | Scribner | 207—6 |

FOREIGN PATENTS 16,463    7/1902    Great Britain.

CHARLES W. LANHAM, *Primary Examiner.*

E. D. O'CONNOR, *Assistant Examiner.*